United States Patent
Hayashi (10) Patent No.: US 7,555,218 B2
(45) Date of Patent: Jun. 30, 2009

(54) OPTICAL TRANSCEIVER HAVING OPTICAL RECEIVER WITH FUNCTION TO CANCEL NOISE ORIGINATED TO OPTICAL TRANSMITTER

(75) Inventor: Shigeo Hayashi, Yokohama (JP)

(73) Assignee: Sumitomo Electric Industries Ltd., Osaka (JP)

(*) Notice: Subject to any disclaimer, the term of this patent is extended or adjusted under 35 U.S.C. 154(b) by 456 days.

(21) Appl. No.: 11/289,771

(22) Filed: Nov. 30, 2005

(65) Prior Publication Data
US 2006/0133814 A1  Jun. 22, 2006

(30) Foreign Application Priority Data
Nov. 30, 2004  (JP)  .................... P. 2004-345254

(51) Int. Cl.
H04B 10/00  (2006.01)
(52) U.S. Cl. .................. 398/136; 398/130; 398/139
(58) Field of Classification Search .......... 398/128–139
See application file for complete search history.

(56) References Cited

U.S. PATENT DOCUMENTS

| | | | | |
|---|---|---|---|---|
| 5,652,425 | A | | 7/1997 | Sawada et al. |
| 5,949,566 | A | * | 9/1999 | Takano ................... 398/189 |
| 6,862,306 | B2 | * | 3/2005 | Shimizu ................ 372/38.02 |
| 2004/0028156 | A1 | * | 2/2004 | Sefidvash et al. ......... 375/346 |
| 2005/0019036 | A1 | * | 1/2005 | Soto et al. ............... 398/135 |

FOREIGN PATENT DOCUMENTS

| | | |
|---|---|---|
| DE | 4101206 A1 * | 7/1991 |
| JP | 2002-335215 | 11/2002 |

* cited by examiner

Primary Examiner—Dzung D Tran
(74) Attorney, Agent, or Firm—Smith, Gambrell & Russell, LLP (57) ABSTRACT

An optical transceiver is disclosed, in which a noise attributed to the large current switching in the optical transmitter and superposed on the signal line in the optical receiver is effectively eliminated. The optical transceiver includes a noise generator and a delay circuit. The noise generator generates a compensation signal from the input signal of the optical transmitter. The compensation signal, having the same waveform and the phase with the noise superposed on the signal line, is input in the main amplifier. Since the phase of noise is delayed by the delay circuit, the main amplifier may cancel the noise as the common mode noise.

15 Claims, 7 Drawing Sheets

OPTICAL TRANSCEIVER HAVING OPTICAL RECEIVER WITH FUNCTION TO CANCEL NOISE ORIGINATED TO OPTICAL TRANSMITTER

BACKGROUND OF THE INVENTION

1. Filed of the Invention

The present invention relates to an optical transceiver that includes an optical transmitter and an optical receiver built in single package.

2. Related Prior Art

In the optical transceiver that includes both the optical transmitter and the optical receiver within the same housing, the noise attributed to the optical transmitter influences the performance of the optical receiver, which is the so-called crosstalk. To suppress this crosstalk is generally used an EMI shield technique in the conventional transceiver.

However, it has been unsuccessful to reduce the noise from the optical transmitter to a level not affecting on the performance of the optical receiver. Several techniques have been known in a field of the optical communication. Japanese patent published as 2002-335215 has disclosed one technique, in which the threshold level for discriminating the data involved in the input optical signal is dynamically adjusted with respect to the transmitted signal that has a burst mode. When the burst mode is ON, i.e., data being practically transmitted, the threshold level is set to the first level, while the burst mode is OFF, i.e., data transmitting being in rest, the threshold level is set to the second level.

The U.S. Pat. No. 5,652,425 has disclosed another technique, in which a receiving optical subassembly that generally includes a light-receiving device and a preamplifier for converting a photocurrent generated by the light-receiving device into a corresponding electrical signal. The subassembly in this prior art further includes a dummy capacitor, the capacitance of which is equivalent to that of the light-receiving device, and a dummy amplifier connected to the dummy capacitor. By connecting the these dummy capacitor and the dummy amplifier to the same power supply with that of the light-receiving device and the preamplifier, and feeding the outputs of the preamplifier and the dummy amplifier by a differential circuit, the common mode noise attributed to the fluctuation of the power supply and the ground line may be cancelled at the output of the differential amplifier.

Figure 8:
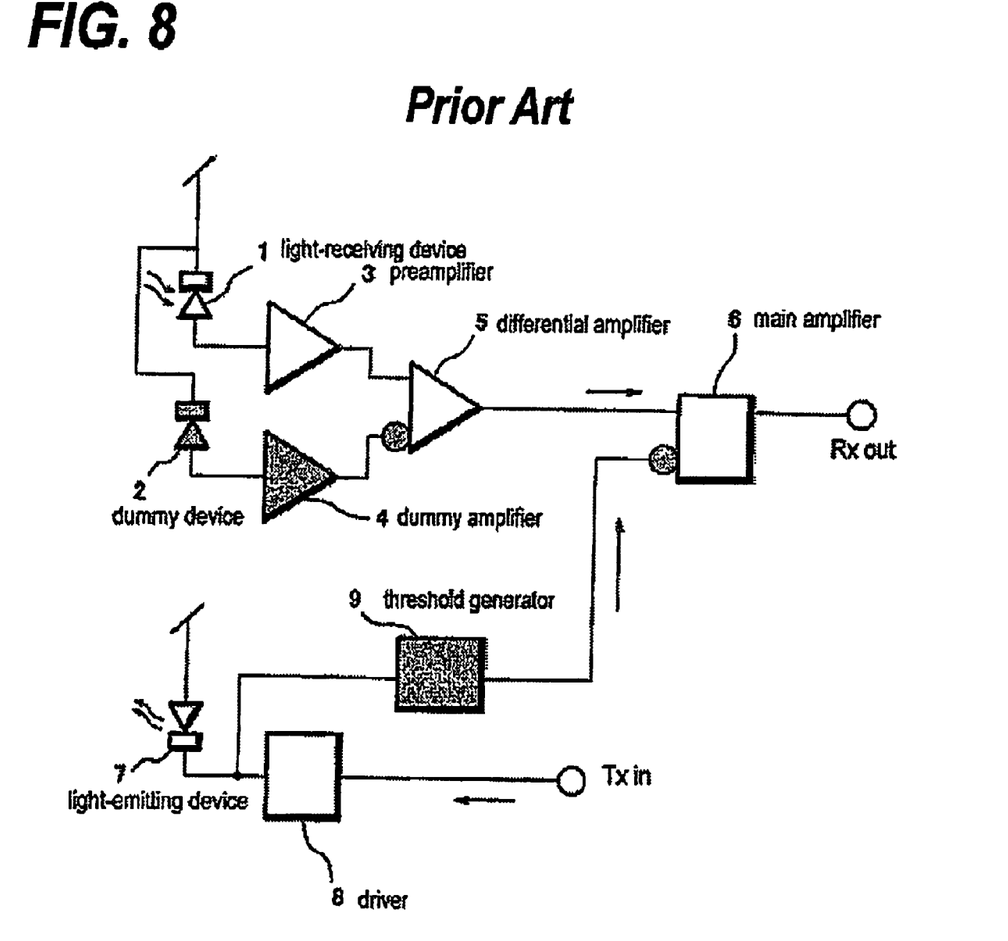
FIG. 8 is a block diagram showing the conventional optical transceiver with the noise eliminating function.

FIG. 8 shows a configuration that combines the first prior art, JP 2002-335215, with the second prior art, U.S. Pat. No. 5,652,425. This optical transceiver comprises the light-receiving device 1, the dummy device that corresponds to the dummy capacitor in the U.S. Pat. No. 5,652,425, the preamplifier 3, the dummy amplifier 4, the differential circuit 5, the main amplifier 6 for the optical receiver, while the optical transmitter includes the light-emitting device 7, the driver 8, and the threshold generator 9.

In the optical receiver, the light-receiving device 1, the dummy device 2, the preamplifier 3, the dummy amplifier 4, and the differential amplifier 5 are installed within a housing. By feeding respective outputs of two amplifiers to the non-inverting and inverting inputs of the differential amplifier 5, the common mode noise superposed on the outputs of two amplifiers, 3 and 4, may be cancelled.

Moreover, an electrical output from the driver 8 in the optical transmitter is fed in the threshold generator 9, in which the output thereof may be adjusted depending on the switching status of the driver 8. This configuration from the output of the driver 8 to the main amplifier 6 in the optical receiver via the threshold generator 9 follows the JP 2002-335215.

In the optical transceiver, typically shown in FIG. 8, the light-emitting device such as laser diode (LD) is modulated by comparably large current over 10 mA. When such large current is switched, a noise is generated by the electromagnetic radiation. Moreover, such large current causes a fluctuation in the power supply line and the ground line due to the equivalent resistance of these lines. Although the power supply line or the ground line are considered to be 0 Ω in the circuit diagram, these lines practically shows substantial resistance. In particular, when the lines are formed by a thin metal film such as on a printed circuit board, the equivalent resistance can not be ignored. To flows a large current in such lines with substantial resistance causes the fluctuation in the voltage thereof, and this fluctuation may be transmitted to the optical receiver as a noise.

On the other hand in the optical receiver, a faint optical signal is necessary to be converted into a corresponding electrical signal and to be amplified by a level capable of being processed in the subsequent stage of the receiver. Generally, the total gain reaches around 30 dB or 40 dB. Accordingly, the noise attributed to the fluctuation of the power lines and the ground lines is also amplified by the gain above. This noise is typically called as the common mode noise.

The differential amplifier may process two signals complementary to each other, namely, having phases different by 180° with respect to the other. This differential amplifier is generally used in the circuit for the small signal because the signal level may be equivalently expanded by twice, which enhances the tolerance to the noise. That is, when one input of the differential amplifier receives a signal with the positive phase, the other input thereof receives another signal with the negative phase at the same time, which equivalently magnifies the input level. Moreover, even the power lines fluctuate by the reason explained above, this fluctuation affects to both signals with the positive and negative phases. That is, assuming that the fluctuation is δ, the signal with the positive phase becomes sig+δ, while that with the negative phase becomes /sig+δ. Here, sig and /sig denote the positive and negative signals, respectively. Finally, the output of the differential amplifier becomes;

$$A*\{(sig+\delta)-(/sig+\delta)\}=A*(sig-/sig),$$

where $A$ is the gain of the amplifier. Thus, the fluctuation δ is not reflected on the output of the differential amplifier.

The prior art shown in FIG. 8, according to the explanation above, provides the dummy device 2 and the dummy amplifier 4 in the receiving optical subassembly, and the differential amplifier to eliminate the common mode noise mentioned above. The light-receiving device 1 and the preamplifier 3 are influenced by the noise via the power supply line and the ground line, while the dummy device 2 and the dummy amplifier 4 are also influenced by the same noise. Receiving two outputs from respective amplifiers by the differential amplifier 5, this common mode noise can be eliminated at the output of the differential amplifier 5, which enhances the noise tolerance of the optical transceiver.

The circuit shown in FIG. 8 may eliminate the noise influencing the light-receiving device 1 and the preamplifier 3. However, for the noise superposed on the signal line between the receiving subassembly and the main amplifier 6, the conventional circuit of FIG. 8 lacks its effect. Therefore, the main amplifier 6 receives the compensation signal form the threshold generator 9 to cancel the noise superposed on the signal line from the differential amplifier 5.

However, the threshold generator 9 traces the bust mode of the transmitted signal as disclosed in JP 2002-335215, which may respond to a relatively slow signal and may not trace the transmitted signal in a bit-by-bit mode. It is quite hard to vary the threshold of the main amplifier in the bit-by-bit mode corresponding to the transmitted signal by the threshold generator 9. Moreover, the circuit shown in FIG. 9 feeds the input of the threshold generator 9 from the output of the driver 8, which may degrade the optical output in the high frequency.

Thus, the present invention is to provide an optical transceiver that effectively eliminates the noise generated by the current switching in the optical transmitter and superposed on the signal line of the optical receiver, accordingly, to provide an optical transceiver with a improved receiving sensitivity.

SUMMARY OF THE INVENTION

An optical transceiver according to the present invention comprises an optical transmitter, an optical receiver, and a noise generator. The optical transmitter, by receiving a first electrical signal, outputs a first optical signal, while, the optical receiver outputs a second electrical signal by receiving a second optical signal. The optical transmitter includes an input terminal, a light-emitting device, a driver, and a delay circuit. The delay circuit delays the first electrical signal and outputs this delayed signal to the driver. The driver, by receiving the delayed signal, switches the light-emitting device in a current mode.

The optical receiver includes a receiving optical subassembly that generally installs a light-receiving device and a preamplifier therein, a main amplifier, and an output terminal. The receiving optical subassembly, by receiving the second optical signal and converting the optical signal to an electrical signal, outputs the electrical signal to the main amplifier. The main amplifier, by receiving the electrical signal from the receiving optical subassembly and a compensation signal output from the noise generator, amplifies the electrical signal from the receiving optical subassembly and outputs the amplified signal to the output terminal as the second electrical signal.

The noise generator, by receiving the first electrical signal input to the input terminal of the optical transmitter, emulates a noise attributed to the switching of the driver in the current mode and outputs this emulated signal to the main amplifier as the compensation signal. Since the main amplifier receives the compensation signal in addition to the signal from the receiving optical subassembly, the noise attributed to the switching of the driver and superposed on the signal from the receiving optical subassembly can be eliminated as a common mode noise. Moreover, the optical transmitter provides the delay circuit for delaying the first electrical signal, which may compensate the delay at the noise generator.

The noise generator may be configured by a low-pass filter and an attenuator. The low-pass filter may be configured by a resistor and a capacitor. In particular, the capacitor is preferably configured by a junction diode with a variable bias condition. The bias voltage of the diode may be controlled by the CPU, which is preferably provided in the optical transceiver, based on a temperature of the transceiver and data stored in the memory accompanied with the CPU. The attenuator is preferably configured by a resistor and a transistor with a gate thereof dynamically controlled by the CPU to adjust the attenuation.

The noise generator preferably includes a high-pass filter, a low-pass filter connected in cascade to the high-pass filter, and a variable gain amplifier, or includes a plurality of systems connected in parallel to each other and a variable gain amplifier commonly connected to the plurality of systems. Each system has a high-pass filter and a low-pass filter connected in cascade to each other. The cut-off frequency of the high-pass filter is preferably higher than the cut-off frequency of the low-pass filter in respective systems. Moreover, the cut-off frequencies of the high-pass filter or the low-pass filter in respective systems are preferably different to each other.

The main amplifier preferably includes a plurality of stages, and the compensation signal is fed to the second or later stage. In this configuration, even the noise generator causes an enough delay and the delay circuit lacks to follow this delay, the delay due to the stages in the main amplifier may compensate the delay circuit. That is, the phase of the compensation signal coincides with that of the noise due to the switching of the driver and superposed on the signal line from the receiving optical subassembly.

DESCRIPTION OF PREFERRED EMBODIMENTS

Next, preferred embodiments of the present invention will be described as referring to accompanying drawings.

Figure 1:
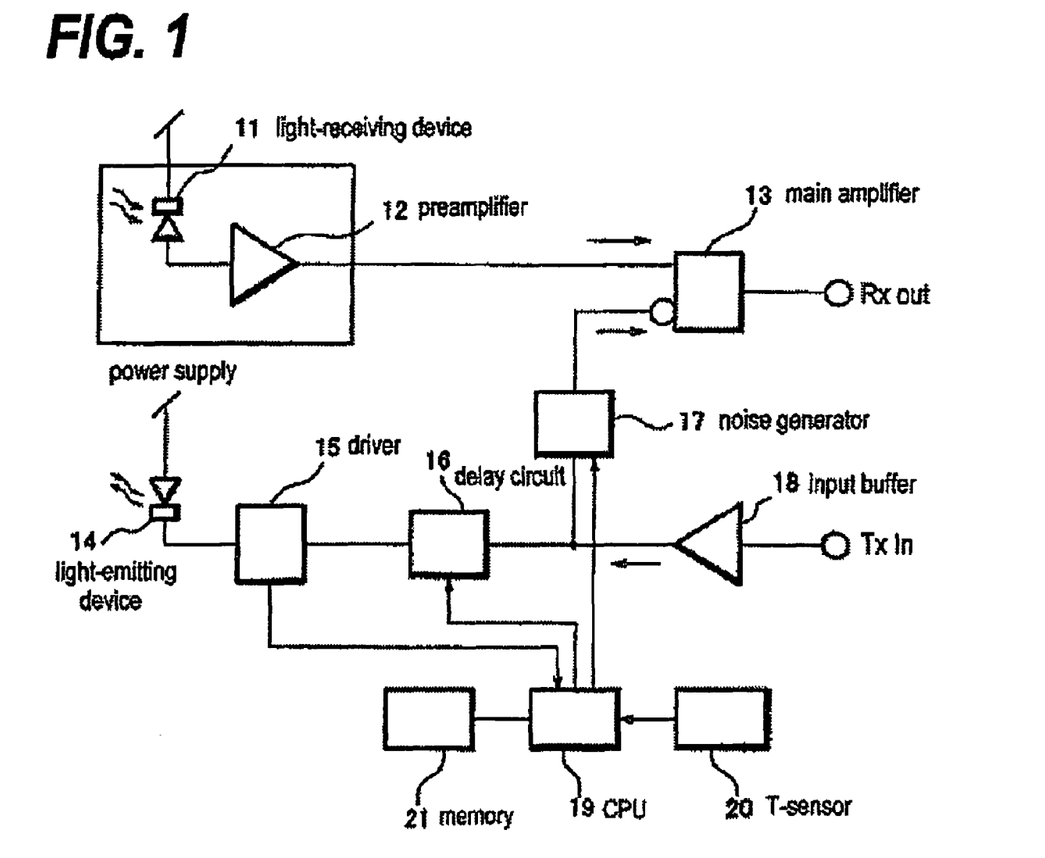
FIG. 1 is a block diagram of the optical transceiver according to the present invention.

FIG. 1 is a block diagram showing an optical transceiver according to the present invention, which includes an optical transmitter and an optical receiver. The optical receiver comprises a receiving optical subassembly (ROSA) having a light-receiving device 11 and a pre-amplifier 12 within a package 10. When the package 10 is made of metal and the subassembly is placed apart from the optical transmitter, the light-receiving device 11 and the pre-amplifier 12 may be escaped from the radiation noise emitted from the optical transmitter. The output of the pre-amplifier 12 is led to a main amplifier 13 to output an electric signal from the output terminal of the optical transmitter with a predetermined magnitude. The main amplifier 13 may be a decision circuit or a comparator to decide whether the output of the pre-amplifier exceeds a predetermined level or not. The ROSA may configure, as shown in FIG. 8, dummy circuits, 2 and 4, and a differential amplifier 5 to eliminate the common mode noise superposed on a node between the light-receiving device 11 and the pre-amplifier 12.

The optical transmitter of the present invention includes an input buffer 18, a delay circuit 16, a driver 15, and a light-emitting device 14. The input buffer is configured to drive the delay circuit 16 and a noise generator 17. The delay circuit 16 makes a timing delay with respect to the signal output from the noise generator 17. The driver 15, by receiving the delayed signal from the delay circuit 16, drives the light-emitting device 14, typically a semiconductor laser diode in a current mode to emit signal light corresponding to the electrical signal input in the input buffer 18. The output of the noise generator 18, which is not intentionally delayed, is led to the main amplifier 13 with an in-phase signal, which means that the phase thereof is equal to that of the output of the driver 15.

The signal line from the input of the transmitter to the output of the driver 15 may run within an integrated circuit when the delay circuit 16 is integrally formed therein, and comparably small current is switched. Accordingly, this portion of the circuit from the input to the output of the driver 15 does not become a noise source. On the other hand, the output of the driver switches a comparably large current to modulate the light-emitting device 14. The large current, synchronized with the signal output from the driver 15, is supplied from the power supply and flown into the output of the driver 15 via the light-emitting device 14. This large current becomes a noise source by two types of mechanisms shown below.

That is, (a) a noise due to a steep rising or a steep falling of the current flowing in the light-emitting device, which propagates as an EMI noise, and (b) a noise superposed on the power supply line and the ground line. The latter noise depends on the impedance of the power supply line or that of the ground line. Occasionally, in particular for high frequencies, the ground line can not be regarded as the line without any resistance. When the large current flows in the power supply line or the ground line, the resistance thereof decreases the supply voltage or increases the ground level by the current feedback effect, which is transferred to the adjacent circuit connected to the same power supply line or the ground line, which is the optical receiver in the present case. Accordingly, the signal transmitted in the optical receiver is affected by this noise through the power supply line and the ground line, in particular, the output from the pre-amplifier is most affected thereby because the amplitude of the signal there is relatively small.

The noise generator 17, which includes a plurality of frequency filters and amplifiers, generates a compensation signal to cancel the noise above explained. However, the filter and the amplifier delay the signal input therein. Accordingly, the present optical transceiver provides the delay circuit 16 between the input buffer 18 and the driver 15 to delay the signal output from the driver 15 with respect to the input of the delay circuit 16, that is, the output of the noise generator 17 becomes in-phase to the output of the driver 15. Therefore, the phase of the noise, due to the current switching by the driver 15, superposed on the signal output from the ROSA becomes in-phase to the output of the noise generator 17.

The main amplifier 13 is generally configured to a differential amplifier, similar to that shown in FIG. 8, with one input thereof receiving the signal output from the pre-amplifier 12, which is superposed with the noise due to the current switching by the driver 15, and the other input receiving the compensation signal output from the noise generator 17. Although this compensation signal is delayed by the noise generator 17, the noise superposed on the signal from the preamplifier is also delayed by the delay circuit 16, thereby making in-phase relative to each other.

The delay timing by the delay circuit 16 and the magnitude of the compensation signal output from the noise generator 17 are controlled by the central processing unit (CPU) 19. The CPU 19, by receiving a feedback signal from the driver 15, a signal corresponding to a temperature of the light-emitting device 14, which is output from the temperature sensor 20, and a control data, stored in the memory 21, controls the delay timing of the output of the driver 15 and the magnitude of the compensation signal.

Thus, two inputs of the main amplifier 13 receive two signals each including noise with the same magnitude and the same phase. Accordingly, the main amplifier 13 may cancel this common phase noise, which improves the sensitivity of the optical receiver. Moreover, the noise generator 17 receives the signal output from the input buffer 18, between the input buffer 18 and the delay circuit 16, which causes less influence to the high frequency performance of the optical transmitter and, accordingly, the light-emitting device 14 outputs the signal light with less degradation.

Figure 2A:
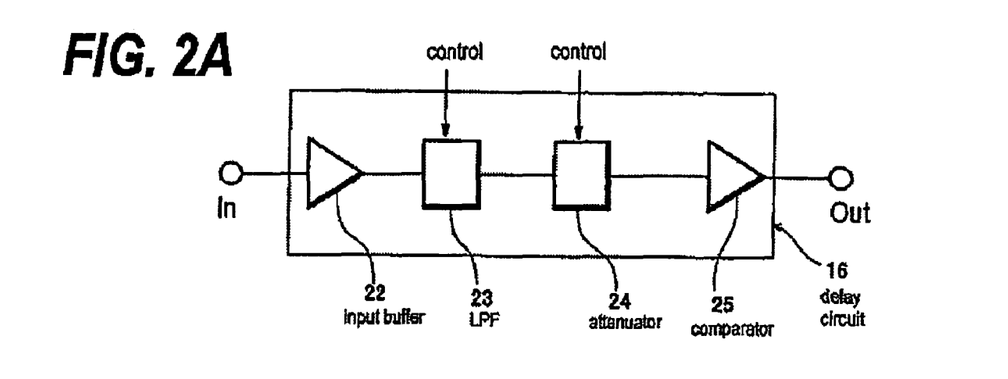
FIG. 2A is a block diagram of an example of the delay circuit of the invention.
Figure 2B:
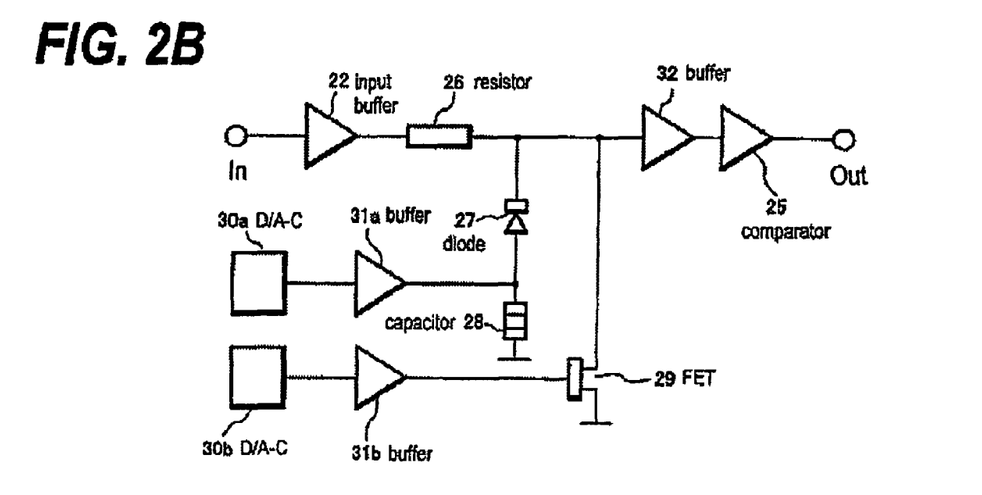
FIG. 2B is a circuit diagram of the delay circuit.
Figure 2C:
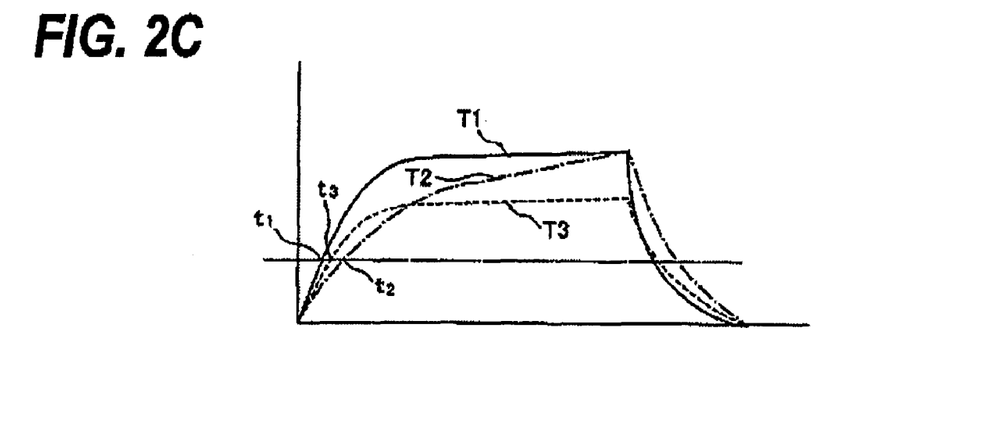
FIG. 2C shows waveforms at various nodes in the delay circuit.

FIG. 2A is an exemplary block diagram of the delay circuit 16 used in the present embodiment, FIG. 2B is a circuit diagram thereof, and FIG. 2C is a time chart showing the delay.

The delay circuit 16 comprises an input buffer 22, a low-pass filter 23, an attenuator 24, and an output buffer 25. When the output impedance of the input buffer 18 is small enough, the input buffer 22 in the delay circuit 16 may be omitted. The low-pass filter (LPF) 23 includes a resistor 26, a diode 27, which is configured in a reverse bias condition to operate as a capacitor, and a capacitor 28. The attenuator 24 includes a field effect transistor (FET) 29 and the resistor 26. The resistor 26 is commonly functioned as the LPF 23 and the attenuator 24. These LPF 23 and the attenuator 24 may adjust both the rising and the falling of the input signal.

Between the diode 27 and the capacitor 28 in the LPF 23 is connected with an buffer circuit 31a with a digital-to-analog converter (D/A-C) 30a controlled by the CPU 19 shown in FIG. 1 to vary the bias voltage to the diode 27. The junction capacitance of the diode 27 depends on the inverse square root of the bias voltage, $V^{-1/2}$. Accordingly, by adjusting the bias voltage to the diode, the capacitance thereof varies so as to change the slope at the rising and the falling time of the signal as shown in FIG. 2C.

The equivalent resistance between the drain and the source of the FET 29 may change depending on the gate bias thereof. Therefore, by putting another buffer circuit 31b with another D/A-C 30b, which is also controlled by the CPU 19, to change the splitting ratio to the resistance 26, the magnitude of the signal input to the input buffer 22 may be attenuated at the input of the second buffer 32. Note that, by attenuating the input signal, the rising and the falling time of the signal may be also varied.

FIG. 2C shows the output of the second buffer 32 for various conditions. By changing the bias voltage to the diode 27, the rising characteristics of the signal may shift from T1, the solid line, to T2 denoted by the chain line, and the delay time may increase from t1 to t2, where the delay time is determined by a period from the beginning of the rising of the signal to a point when the signal output from the attenuator 24 intersects a predetermined value corresponding to the threshold of the comparator 25, which is denoted as the dashed line.

On the other hand, by attenuating the signal by changing the bias voltage to the gate of the FET 29, the behavior of the output from the attenuator 24, which is equivalent to the output of the second buffer 32, may shift from T1 to T3 denoted by the broken line, and the delay time thereof may vary from t1 to t3. Thus, by adjusting the bias voltage to the diode 27 and to the gate of the FET 29, the delay circuit 16 may be configured with a variable delay function.

The output from the attenuator 24 is reshaped to a pulse signal by the comparator 25 via an output buffer 32. The delay time at the delay circuit 16 mentioned above depends on the temperature and the power supply voltage. In the present invention, since the CPU 19 monitors the temperature and the power supply voltage, the CPU may optimize the delay time by adjusting the D/A-C's, 30a and 30b, to cancel the noise superposed on the optical receiver with that generated by the noise generator 17.

Figure 3A:
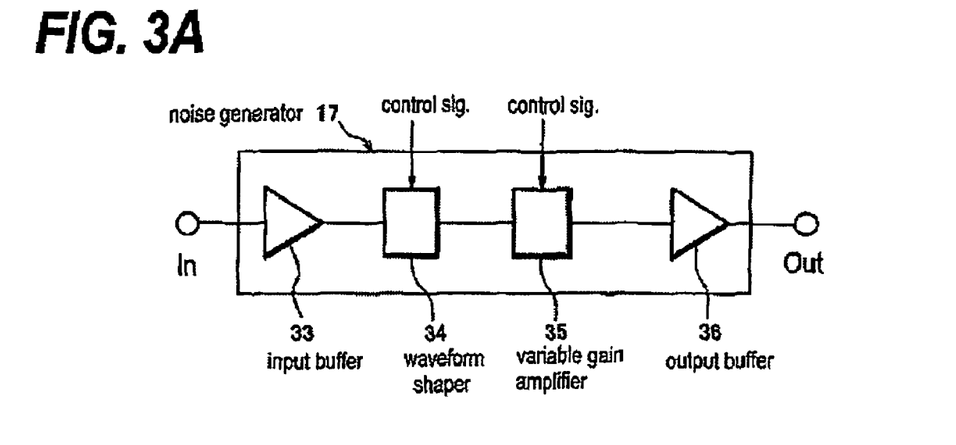
FIG. 3A is a block diagram of the noise generator.
Figure 3B:
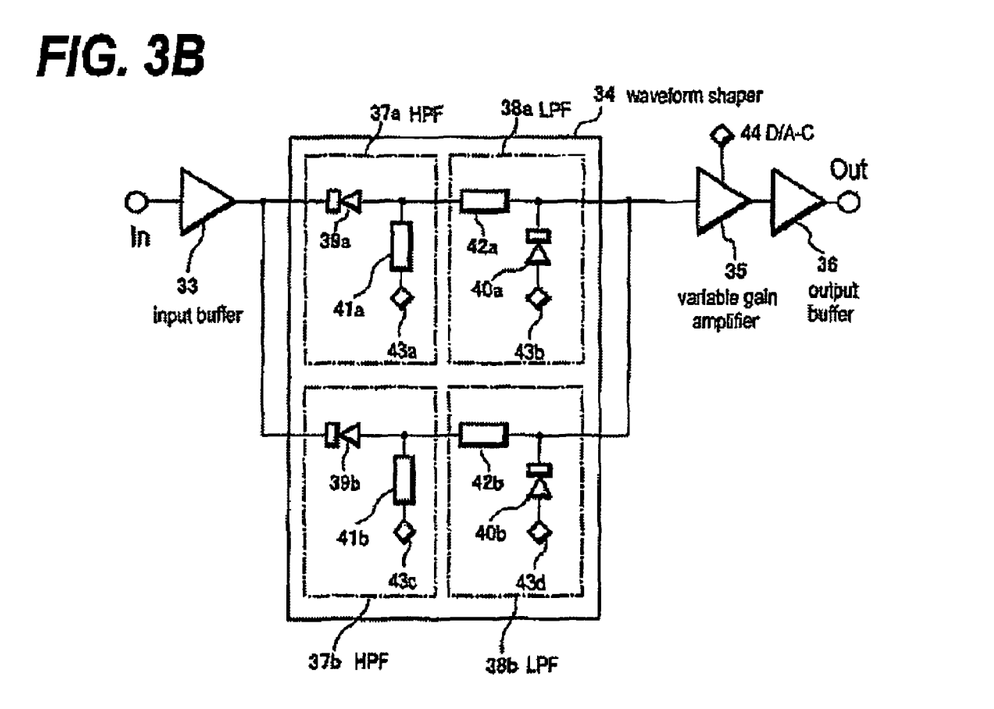
FIG. 3B is circuit diagram showing an example of the noise generator.
Figure 4A:
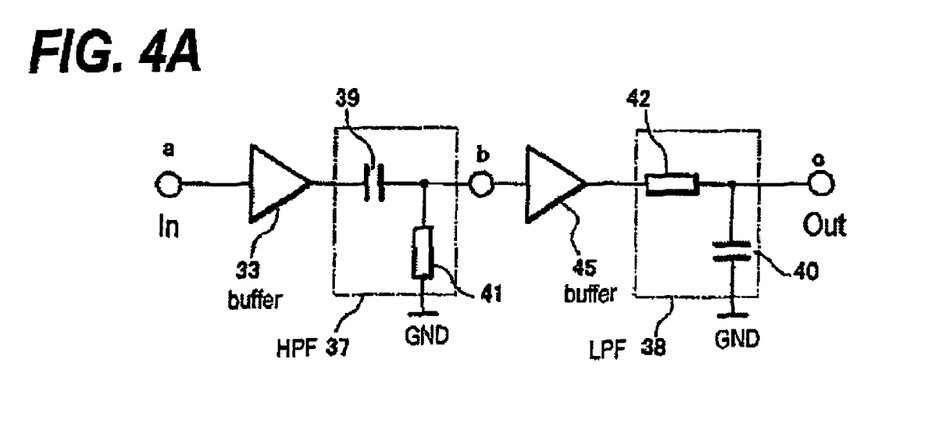
FIG. 4A shows an example of the wave form shaper in the noise generator, and FIG. 4B show waveforms at various nodes in the waveform shaper.
Figure 4B:
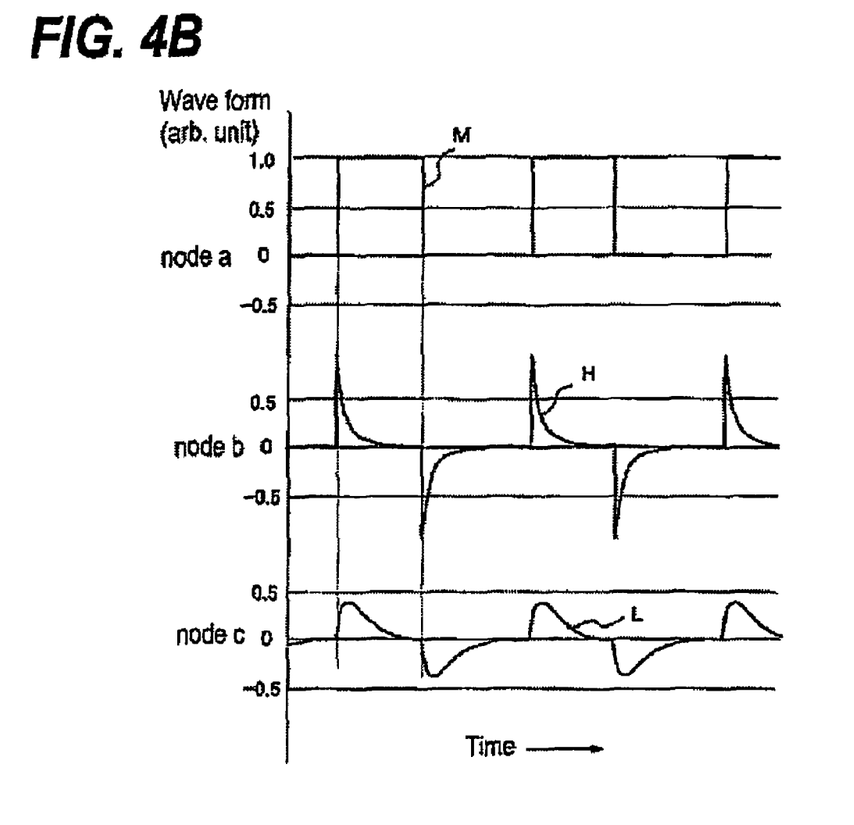
Figure 5A:
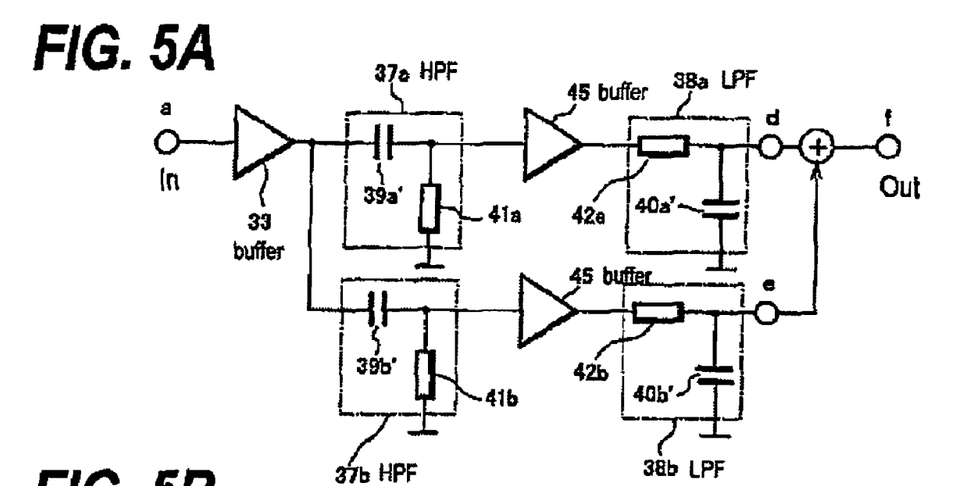
FIG. 5A shows another example of the waveform shaper, and FIG. 5B show waveforms at nodes in this waveform shaper.
Figure 5B:
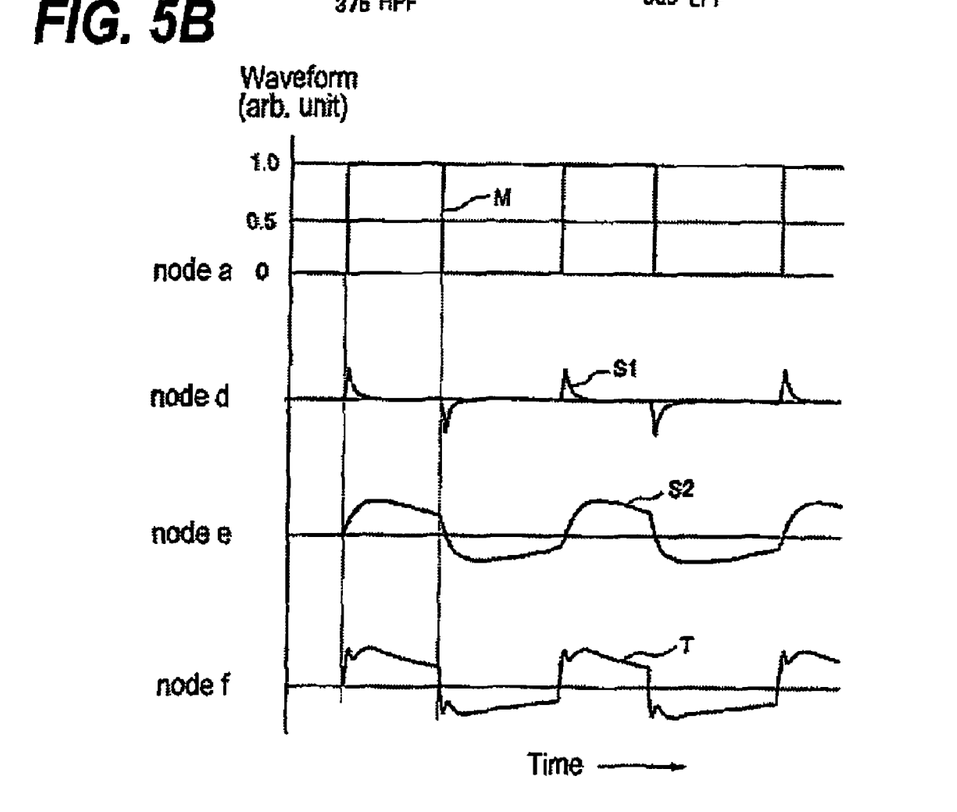

From FIG. 3 to FIG. 5 are exemplary circuit diagrams of the noise generator.

The noise generator 17 generates a signal that compensates both (a) the noise caused by the radiation from the output of the driver 15, and (b) the noise caused primarily by the substantial impedance of the power supply line and the ground line. To compensate these two noises, the timing (the phase), the waveform, and the magnitude thereof are necessary to be adjusted. In the present embodiment, the timing thereof may be adjusted by the delay circuit 16 installed in the optical transmitter. Accordingly, the noise generator 17 is necessary to compensate rest two noise component, the waveform and the magnitude.

The noise generator 17, as shown in FIG. 3A, comprise an input buffer 33, a waveform shaper 34, a variable gain amplifier, and an output buffer 36. The input 33 normalizes the signal input therein. The waveform shaper 34, including high-pass filters (HPF), 37a and 37b, and low-pass filters (LPF), 38a and 38b, to emulate the waveform of the noise. The variable gain amplifier adjusts the magnitude the emulated noise signal output from the waveform shaper 34 to generate the compensation signal. The waveform shaper 34 is necessary to trace the waveform of the noise in precise. However, the size of the waveform shaper 34 becomes large as improving the precision of the trace.

FIG. 3B is an example of the waveform shaper 34 that includes two systems of the HPF and the LPF connected in cascade to each other. The HPFs, 37a and 37b, include diodes, 39a and 39b, and resistors, 41a and 41b, connected in series to respective diodes, 39a and 39b. The LPFs, 38a and 38b, include resistors, 42a and 42b, and diodes 40a and 40b, connected in series to respective resistors, 42a and 42b. The output waveform of the HPFs, 37a and 37b, and that of the LPFs, 38a and 38b, depend on the equivalent capacitance of the diodes and the resistance of the resistors. Since the junction capacitance of the diode, as aforementioned, depends on the bias voltage applied thereto, and the bias voltage may be controlled by the CPU 19 via the D/A-Cs, 43a to 43d, the output waveform of the LPFs and the HPFs can be optionally controlled. Moreover, the magnitude of the output signal from the LPFs and the HPFs is adjusted by the variable gain amplifier 35 with the D/A-Cs 44 to vary the gain thereof.

FIG. 4A shows another example of the waveform shaper 34 with single system of the HPF 37 and the LPF 38 connected in cascade, and FIG. 4B shows waveforms of various nodes, a to c, in FIG. 4A. The HPF 37 includes a capacitor 39 with the capacitance of 1 pF and a resistor 41 with the resistance of 50 Ω, while the LPF 38 includes a resistor 42 with the resistance of 50 Ω and a capacitor 40 with the capacitance of 1 pF connected in series to the resistor 42. The cut-off frequencies of the HPF 37 and the LPF 38 become 3.3 GHz.

A signal with a rectangular waveform and the frequency of 1.25 GHz is input to this waveform shaper 34 at the input node a. The input signal M is normalized by the input buffer 33 and is differentiated by the HPF 37 to create a pulsed waveform H. Subsequently, this pulsed waveform H is integrated by the LPF to form a dulled waveform L at the node c.

The waveform shaper shown in FIG. 4A inserts a buffer circuit 45 between the HPF 37 and the LPF 38 to isolate two filters. Without the buffer circuit 45, the LPF 38 operates as a load circuit for the HPF 37 and the frequency response occasionally becomes quite complex. Although the circuit size increases, the buffer circuit 45 is preferably inserted to isolate two filters, 37 and 38.

FIG. 5A shows another waveform shaper 34 that configures two systems of the HPF and the LPF connected in cascade to each other, and FIG. 5B shows waveforms at various nodes in FIG. 5A. The first system includes the HPF 37a, the buffer circuit 45a, and the LPF 38a, while the second system includes the HPF 37b, the buffer circuit 45b, and the LPF 38b. The former system has a relatively higher cut-off frequency.

That is, the capacitance of the capacitor 39a' in the first HPF 37a is set to be 1 pF and the resistance of the resistor 41a is 5 Ω, while the resistance 42a in the LPF 38a is set to be 10 Ω, and the capacitance of the capacitor 40a' is set to be 1 pF. Thus, the cut-off frequency of the HPF 37a becomes about 33 GHz, while that of the LPF 38a becomes about 16 GHz. Accordingly, the first system passes frequency components over 30 GHz and below 10 GHz. As shown in FIG. 5B, when a rectangular signal M is input at the node a and normalized by the input buffer 33, a pulsed waveform S1 corresponding to the falling and the rising edges of the rectangular pulse M appears at the node d, which is the output node of the first system.

The second system includes the HPF 37b and the LPF 38b, which have lower cut-off frequencies compared to those of the first system. That is, the HPF 37b includes a capacitor 39b' with the capacitance of 1 pF and a resistor 41b with the resistance of 75 Ω, while the LPF 38b includes a resistor 42b with the resistance of 10 Ω and a capacitor 40b' with the capacitance of 30 pF. An intermediate buffer 45b is also inserted between the HPF 37b and the LPF 38b to isolate two filters.

Thus, the cut-off frequency of the HPF 37b becomes about 2 GHz, while that of the LPF 38b becomes about 500 MHz. That is, the second system passes frequency components over 2 GHz and those below 500 MHz. As shown in FIG. 5B, when the rectangular pulse M is input at the node a and normalized by the input buffer 33, the node e, which is the output node of the second system, shows a dulled signal S2 that does not trace the falling and rising edges of the rectangular pulse M, i.e., follows the pulse M with a time delay and decreases at the stable state of the pulse M.

A sum of two outputs from the first and second systems is output from the noise generator 34 as a compensation signal, namely, the summed waveform at node f becomes T shown in FIG. 5B, which emulates the noise superposed on the signal line in the ROSA. Although the configuration in FIG. 5A uses capacitors, from 39a' to 40b', with the fixed capacitance, it may be applicable to use variable capacitor such as a junction diode with the bias voltage thereof being capable of dynamically controlled to adjust cut-off frequencies for each system to obtain an optimal compensation signal.

When the laser diode (LD) is used as the light-emitting device in the optical transmitter, since the LD shows the strong dependence in its performance on the temperature, the current supplied to the LD is necessary to adjust as the temperature changes. In this case, the compensation signal generated in the noise generator is also necessary to be varied as the temperature varies.

In the present invention, the optical transceiver provides the sensor 20 to monitor the temperature of the light-emitting device 14, as shown in FIG. 1. Also, the information on the driving current provided to the light-emitting device 14 is fed from the driver 15 to the CPU 19. Based on these two monitored information and the data stored in the memory 21, the bias voltages applied to the diode and the gate of the FET in the delay circuit 16 may be dynamically varied. Moreover, the cut-off frequencies of the HPFs and the LPFs in the noise generator may be dynamically optimized to compensate the noise superposed on the signal line in the optical receiver.

Figure 6:
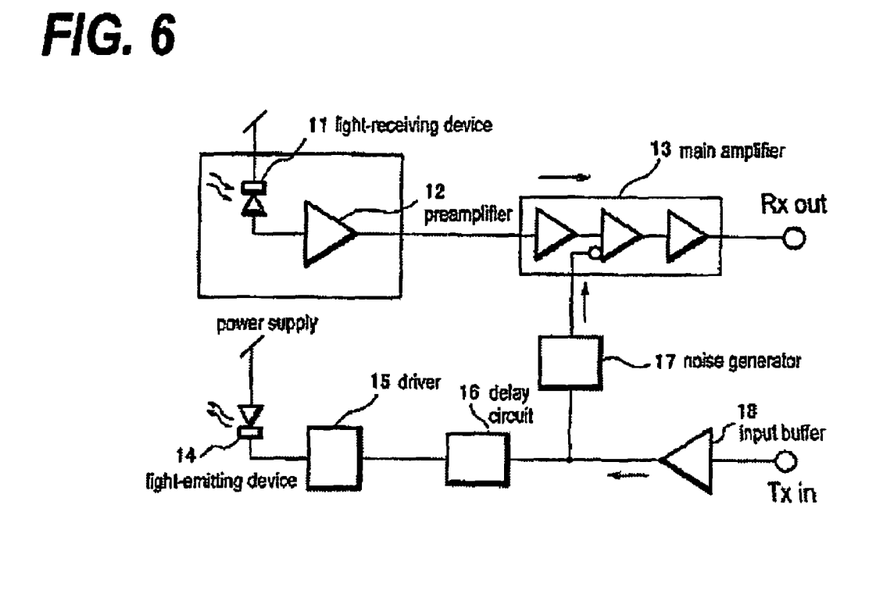
FIG. 6 is a block diagram of another embodiment of the invention.

FIG. 6 shows an alternative of the present invention, in which the main amplifier 13 includes a plurality of differential amplifiers connected in cascade to each other. The compensation signal generated in the noise generator 17 may be fed to the second or later stage of the amplifier. The signal in the optical transmitter is delayed by the delay circuit 16 in the present invention. However, the enough delay time can not be occasionally obtained depending on the temperature, the circuit configuration, and the bias conditions for the light-emitting device 14.

On the other hand, when the main amplifier 13 is comprised of a plurality of amplifying stages cascaded to each other, a propagation delay may occur at each stage from the first to the last. Therefore, even when the first stage lacks the delay time necessary for canceling the superposed noise, the second stage or later may provide an enough delay. By feeding the compensation signal to the later stage to be in phase with the noise superposed on the signal line in the optical receiver, the noise may be canceled.

Figure 7:
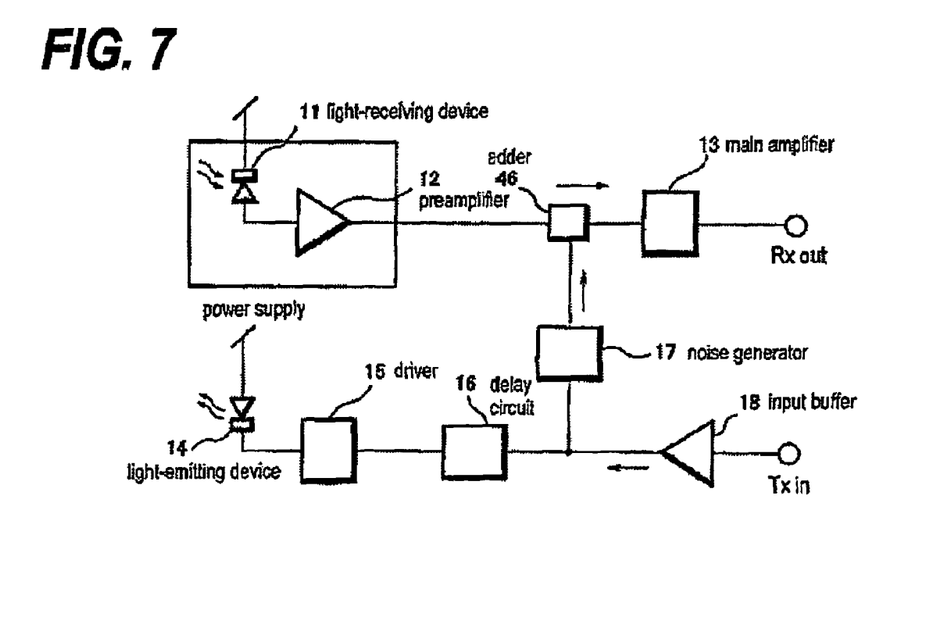
FIG. 7 is a block diagram of still another embodiment of the invention.

FIG. 7 shows another alternative of the present invention. In FIG. 7, an analog adder circuit 46 is installed before the main amplifier 13, and the main amplifier 13 is not restricted to those having the differential input. The analog adder circuit 46 receives the signal from the preamplifier 12 and the compensation signal from the noise generator in a phase opposite to the former signal.

Since the compensation signal is input in the opposite phase, the analog adder circuit subtracts the compensation signal from the signal from the preamplifier 12, that is, only the noise superposed on the signal from the preamplifier 12 is subtracted by the compensation signal. The signal, the noise superposed thereon is thus subtracted, is fed to the main amplifier 13 and output from the transceiver.

When the main amplifier 13 is comprised of a plurality of amplifiers as shown in FIG. 6, the analog adder circuit 46 may be placed between amplifiers, immediately before the second or later amplifiers. Even the enough delay is not obtained in the configuration that the analog adder circuit 46 is placed before the first stage, the second or layer amplifier may occasionally provide a substantial delay to cancel the superposed noise.

It will become apparent to those skilled in the art that various modifications to the preferred embodiment of the invention as described herein can be made without departing from the spirit or scope of the invention as defined by the appended claims.

What is claimed is:

1. An optical transceiver for outputting a first optical signal by receiving a first electrical signal and outputting a second electrical signal by receiving a second optical signal, the optical transceiver comprising:
   an optical transmitter including,
   an input terminal for receiving the first electrical signal,
   a light-emitting device for outputting the first optical signal corresponding to the first electrical signal to an optical fiber,
   a delay circuit for delaying the first electrical signal, and
   a driver for receiving the delayed signal and for switching the light-emitting device in current mode by receiving the delayed signal;
   an optical receiver including,
   a receiving optical subassembly for receiving the second optical signal from an optical fiber, converting the second optical fiber into an electrical signal, and outputting the electrical signal, the second optical signal being different from the first optical signal,
   a main amplifier for receiving the electrical signal from the receiving optical subassembly, and
   an output terminal for outputting the second electrical signal; and
   a noise generator for receiving the first electrical signal to generate a compensation signal to be fed to the main amplifier of the optical receiver,
   wherein the compensation signal fed to the main amplifier of the optical receiver cancels a noise generated by the switching of the driver driven by the delayed signal and superposed on the electrical signal from the receiving optical subassembly.

2. The optical transceiver according to claim 1,
   wherein the noise generator includes a high-pass filter, a low-pass filter connected in cascade to the high-pass filter comprising a cascaded circuit, and a variable gain amplifier is connected in cascade to the cascaded circuit of the high-pass filter and the low-pass filter.

3. The optical transceiver according to claim 2,
   wherein the high-pass filter and the low-pass filter each includes a junction diode with a variable bias configuration to dynamically adjust a cut-off frequency of the filter.

4. An optical transceiver for outputting a first optical signal by receiving a first electrical signal and outputting a second electrical signal by receiving a second optical signal, comprising:
   an optical transmitter including,
   an input terminal for receiving the first electrical signal,
   a light-emitting device for outputting the first optical signal corresponding to the first electrical signal,
   a delay circuit for delaying the first electrical signal, and
   a driver for receiving the delayed signal and for switching the light-emitting device in current mode by receiving the delayed signal;
   an optical receiver including,
   a receiving optical subassembly for converting the second optical signal into an electrical signal and outputting the electrical signal,
   a main amplifier, and
   an output terminal for outputting the second electrical signal; and
   a noise generator for receiving the first electrical signal for generating a compensation signal by a phase opposite to the switching of the driver,
   wherein the optical receiver includes an analog adder circuit for adding the compensation signal with the electrical signal and outputting an added signal to the main amplifier, and
   wherein a noise generated by the switching of the driver and superposed on the electrical signal from the receiving optical subassembly is cancelled by the compensation signal output from the noise generator.

5. The optical transceiver according to claim 4,
   wherein the delay circuit includes a low-pass filter and an attenuator connected in cascade to each other.

6. The optical transceiver according to claim 5, wherein the low-pass filter includes a resistor and a junction diode with a variable bias configuration to dynamically adjust a cut-off frequency of the low-pass filter.

7. The optical transceiver according to claim 5, wherein the attenuator includes a resistor and a transistor with a control electrode to dynamically adjust the attenuation of the attenuator.

8. The optical transceiver according to claim 4,
wherein the noise generator includes a plurality of systems connected in parallel to each other, the systems each having a high-pass filter and a low-pass filter connected in cascade to each other, and a variable gain amplifier commonly connected to the plurality of systems.

9. The optical transceiver according to claim 8,
wherein the cut-off frequency of the high-pass filter is higher than the cut-off frequencies of the low-pass filter in respective systems.

10. The optical transceiver according to claim 8,
wherein the cut-off frequencies of the high-pass filter in respective systems are different to each other.

11. The optical transceiver according to claim 8,
wherein the cut-off frequencies of the low-pass filter in respective systems are different to each other.

12. The optical transceiver according to claim 4,
wherein the main amplifier is configured to be a plurality of stages, the compensation signal output from the noise generator being fed to a second or later stage.

13. The optical transceiver according to claim 4,
further includes a central processing unit for controlling the noise generator and the delay circuit.

14. The optical transceiver according to claim 13,
further includes a temperature sensor and a memory, the central processing unit controlling the noise generator and the delay circuit based on temperatures sensed by the temperature sensor and data stored in the memory in connection with the temperature.

15. The optical transceiver according to claim 4,
wherein the optical transmitter and the optical receiver have a common ground.

* * * * *